Oct. 2, 1928.
S. A. W. OKELL ET AL
1,686,100
APPARATUS FOR THE ACTIVATION OR REVIVIFICATION OF CARBON
Filed Aug. 1, 1925   3 Sheets-Sheet 1
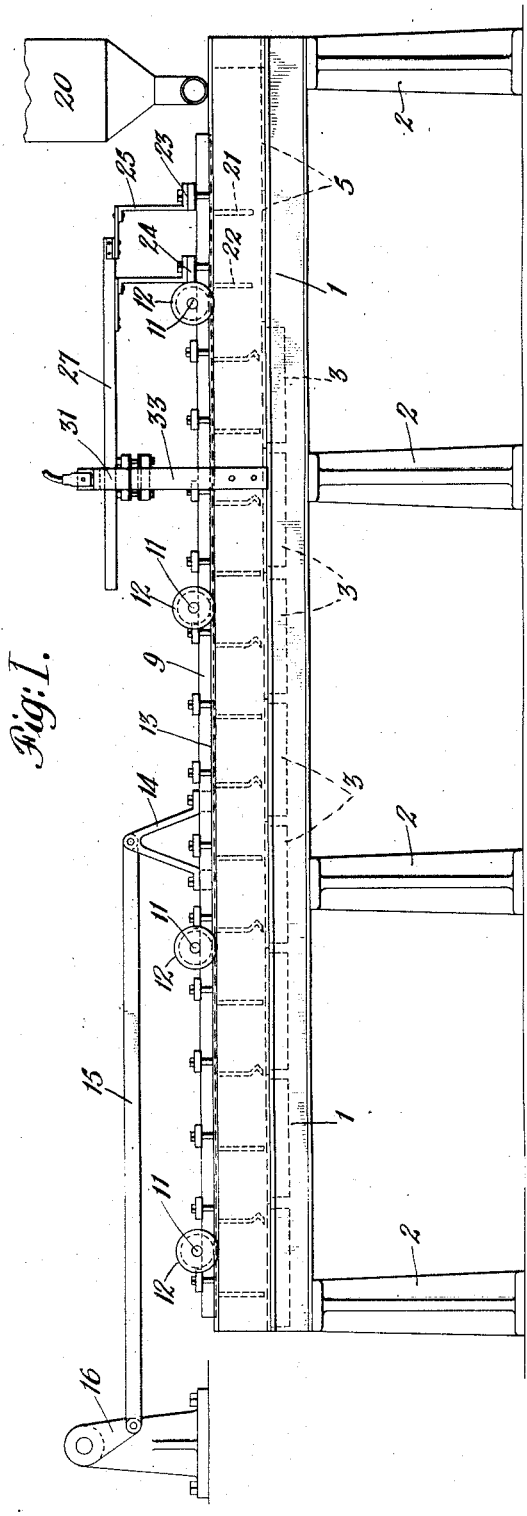
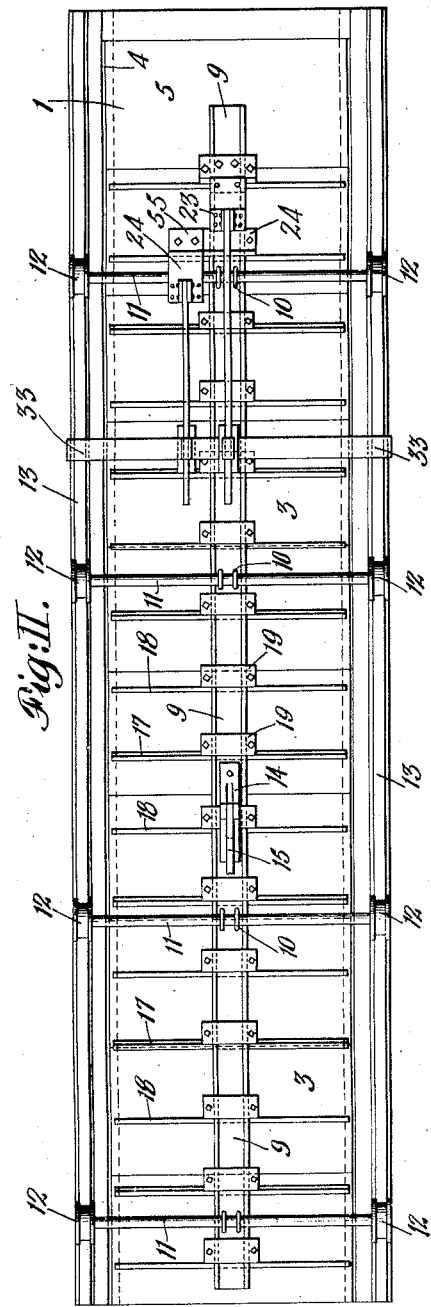
INVENTORS
Stanley A. W. Okell and Leonard Wickenden
BY Maxwell Barus
Their ATTORNEY

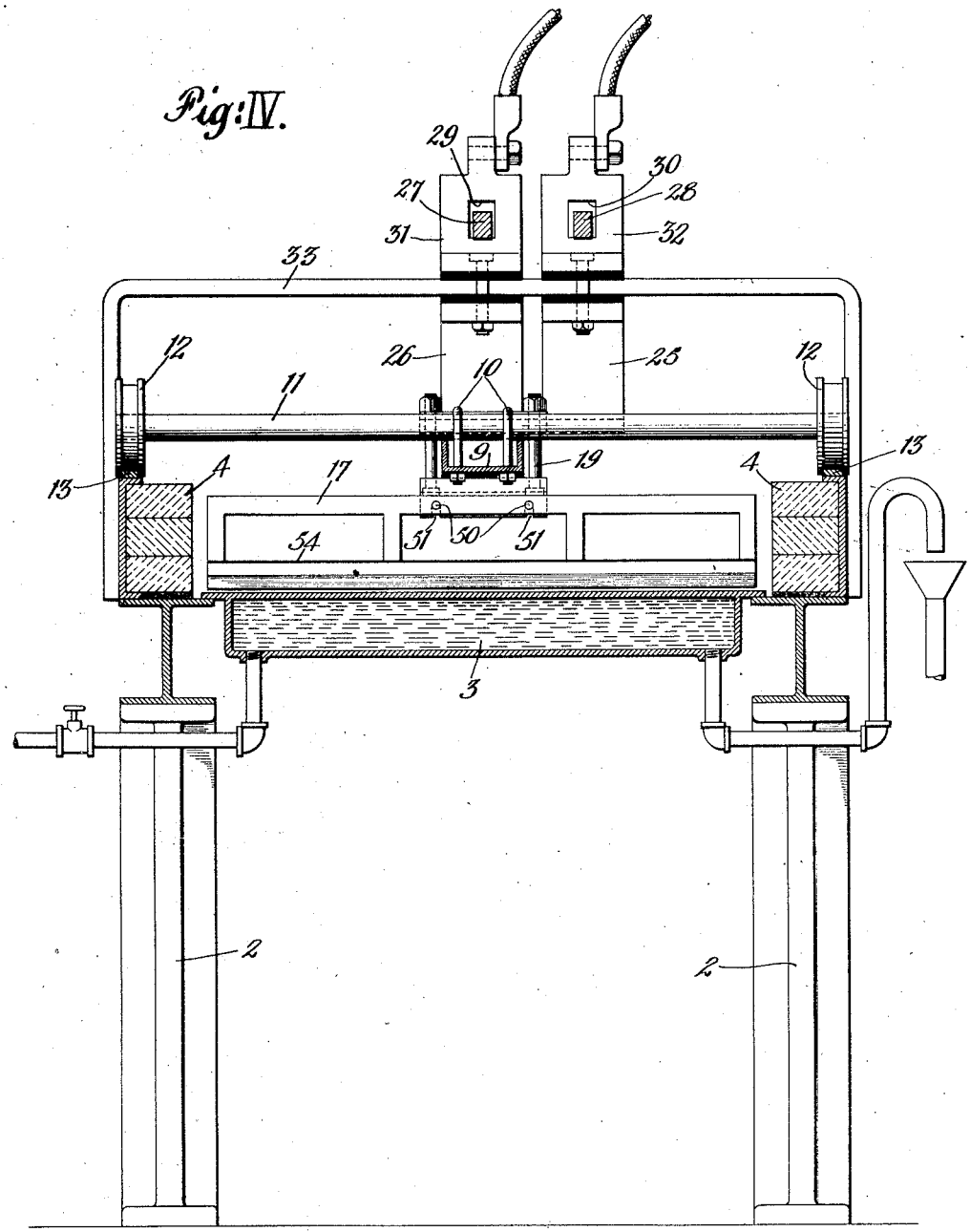

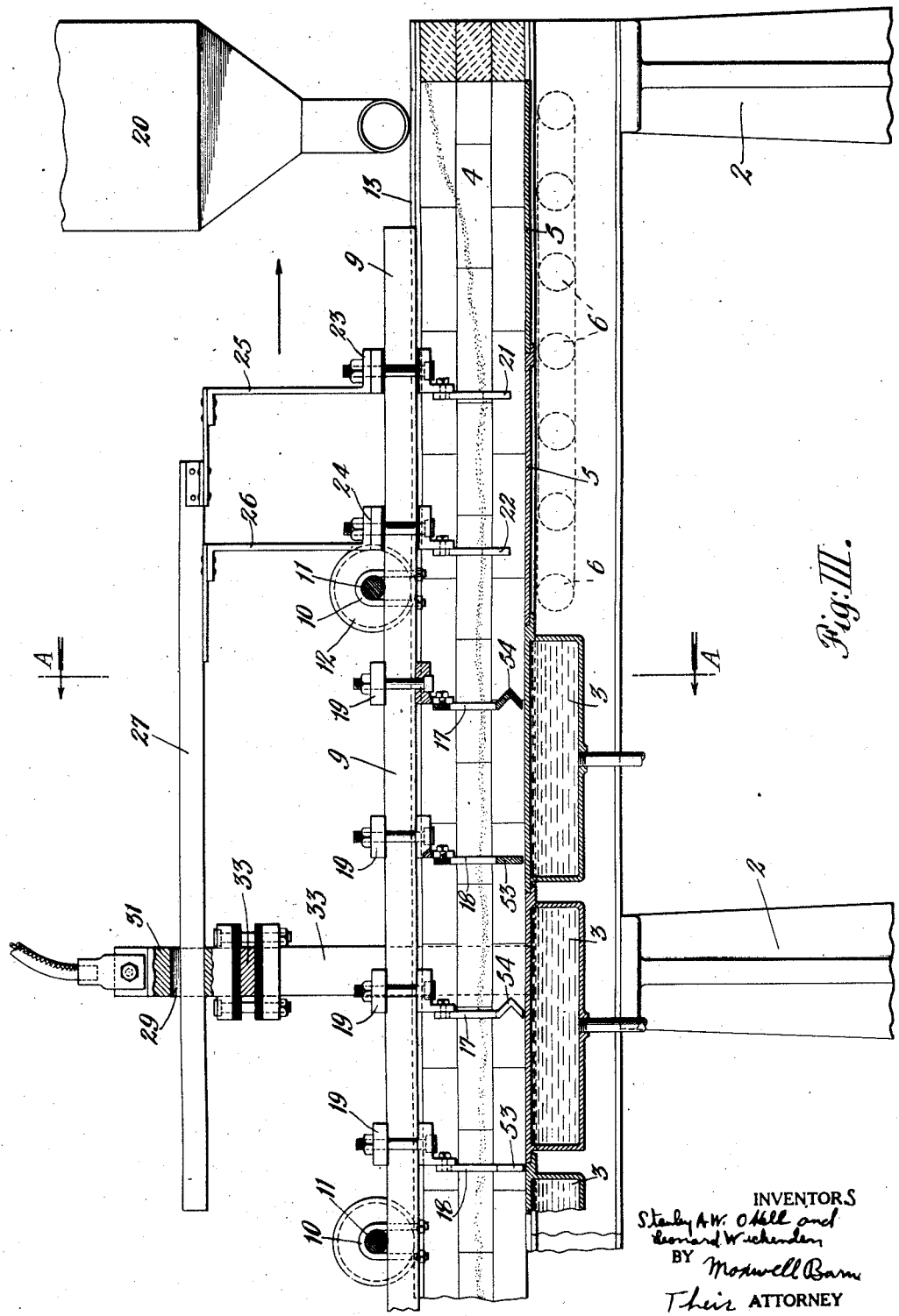

Patented Oct. 2, 1928.

1,686,100

UNITED STATES PATENT OFFICE.

STANLEY A. W. OKELL, OF TYRONE, PENNSYLVANIA, AND LEONARD WICKENDEN, OF FLUSHING, NEW YORK, ASSIGNORS TO INDUSTRIAL CHEMICAL COMPANY, OF NEW YORK, N. Y., A CORPORATION OF NEW YORK.

APPARATUS FOR THE ACTIVATION OR REVIVIFICATION OF CARBON.

Application filed August 1, 1925. Serial No. 47,480.

This invention relates to the activation or revivification of carbon. It is exceedingly useful for treating decolorizing carbon of the type prepared from calcined carbonaceous liquid residues from paper pulp manufacture. It is also applicable to the treatment of absorptive carbon derived from any source.

In our copending application, Serial No. 626,935, it is pointed out that such liquid residues are advantageously subjected to a preliminary treatment with suitable gases in an electric furnace at temperatures in the neighborhood of 750 to 950° C., as therein more fully described, and then subjected to an activating treatment at temperatures of 350 to 450° C. in the presence of air. This invention may be advantageously employed in lieu of the rotary type of apparatus described in detail in said application, Serial No. 626,935, for carrying out the latter step.

According to the present invention, the particles of carbon to be activated are fed into a substantially horizontal trough-like apparatus in which they are exposed to the air at a suitable activating temperature, say 450° C. in a thin layer while being subjected to agitation of a character adapted to propel the charge through the trough and at the same time to expose all sizes of the carbon particles to equivalent conditions of treatment.

The trough apparatus may be conveniently made about 3 feet wide and 15 feet long, the carbon being fed in at one end and discharged at the other. The agitation and propulsion of the carbon along the trough is brought about by means of a series of rakes which oscillate longitudinally in respect to the trough. Some or all of the oscillating rakes are so shaped that they propel the carbon to a greater extent in one direction than in the other, thus causing the mass to move toward the discharging end of the trough in a thin layer while agitating, and exposing the individual particles to similar conditions of treatment.

Referring to the drawings: Fig. I is a side elevation and Fig. II a plan view of one form of apparatus adapted for carrying out the invention; Fig. III is an enlarged side elevation partly in section of the feed end of the trough; Fig. IV is a cross section from the line A—A of Fig. III looking in the direction indicated by the arrows.

Again referring to the drawings: 1 represents a long shallow trough which, as above indicated, may be made about 15 feet long and 3 feet wide. It is mounted at a convenient height on standards 2. The bottom of trough 1 is advantageously lined with water-cooled cast iron plates 3, except near the feed end, and the sides with refractory material 4, as is best illustrated in Figs. III and IV.

Near the feed end of the trough the bottom is lined with cast iron plates 5 which are not provided with water jackets like the plates 3. Beneath the plates 5 are a series of gas burners 6 which furnish an alternative or auxiliary heating means to the electrical means hereinafter described. Carbonized residues of the type above mentioned may conveniently be heated by such electrical means, but some other types of carbon cannot be effectively heated by that electrical method. For such other types of carbon heating means such as the gas burners 6 may be employed.

Near the center of the trough is suspended a bar 9 which may be conveniently made of channel iron. The bar 9 is suspended by iron straps 10 from a series of cross bars 11. The cross bars 11 are provided at either end with grooved wheels 12 which roll on tracks 13 on each side of the trough. A wish bone 14 extends upward from the bar 9 and is pivoted at the top to a link 15 which is connected to a suitable power mechanism such as crank 16 whereby the bar 9 is caused to reciprocate when the apparatus is in use. From the bar 9 are suspended a series of rakes 17 and 18 which are attached to the bar by clamps 19. The rakes 17 and 18 extend across the trough, as indicated in Fig. IV, and are adjustably attached to the clamps 19 by set screws 50 in slots 51 so that the bottom of the rakes may be adjusted to clear the bottom of the trough by a narrow margin.

It is usually desirable, as best illustrated in Figs. III and IV, to have some of the rakes, as 18, provided with straight bottom cross bars 53 so that they serve only for purposes of agitation, and some of the rakes, as 17, provided with V-shaped bottom cross bars 54 which tend to propel the charge gradually through the trough.

The propelling rakes 17 are so shaped that the rakes tend to slide through the charge more or less on the back stroke and to hold the charge more effectively on the front stroke. Thus the charge is gradually advanced through the trough.

The charge advantageously in a hot condition, is fed into the trough by means of the feed hopper 20, and tends to pile itself in a sloping mound at the feed end of the trough until it comes in contact with the electrode rakes 21 and 22. These electrode rakes 21 and 22 are attached to the bar 9 by means of clamps 23 and 24 which are carefully insulated from the bar 9 by sheets of mica, or other suitable insulating material (Fig. III). The clamp 24 is provided with a lateral extension 55 (Fig. II). From the clamp 23 and lateral extension 55 of clamp 24, uprights 25 and 26 connect horizontal bars 27 and 28 which slide through slots 29 and 30 in the electric brushes 31 and 32. The electric brushes 31 and 32 are advantageously clamped upon a wicket 33, which bridges the trough, and are carefully insulated from the wicket 33 by strips of mica, or other suitable material, as indicated in Figs. III and IV. The parts 21, 22, 23, 24, 25, 26, 27 and 28 are made of material suitable for the conducting of electricity and are electrically connected to each other and to a suitable source of electric current at the brushes 31 and 32.

The oscillating electrode rakes 21 and 22 are raised materially above the bottom of the trough so that the current passes through a substantial thickness of the carbon material from one rake to the cast iron bottom and thence through a similar thickness to the other electrode rake. If desired, the bottom plates 5 may be made of insulating material such as brick work, in which case the path of the current is through the charge from one electrode rake to the other. In this case it is not necessary to raise the rakes 21 and 22.

The rakes 21 and 22 may, if desired, be shaped like the rakes 17 to propel the charge. But gravity usually provides a sufficient propulsive force when the sloping pile of carbon particles at the feed end of the trough is agitated by flat rakes, as illustrated in the drawings.

The current is adjusted to heat the charge around the electrodes to a suitable activating temperature, such as 450° C. Once heated, the charge tends to maintain, or even increase, its heat as it passes through the trough, due to the partial oxidation or combustion of the charge. The average temperature of the mass is, therefore, regulated and the combustion limited by means of the cooling devices 3, the average temperature being gradually lowered to below the combustion point as the charge arrives at the discharge end of the trough. At the discharge end of the trough the charge falls off to the floor or to any suitable bin or conveyor (not shown).

For purpose of original activation an open trough, such as illustrated in the drawings, is generally advantageous. But when our invention is used for revivification purposes, it is frequently possible to activate the material with less combustion than will occur in the open trough. Hence, it is sometimes desirable to cover the trough in any suitable manner, to control the quantity of air admitted by dampers along the side of the trough and to provide a flue for the discharge of the products of combustion.

It will be obvious from the foregoing that many modifications may be made in form and detail without departing from the spirit and scope of our invention.

What we claim is:

1. In apparatus for activating or revivifying carbon, a long shallow trough provided with a longitudinal series of rakes, means for causing the rakes to oscillate longitudinally to and fro, the rakes being so shaped as to agitate and gradually propel the charge from rake to rake through the trough.

2. In apparatus for activating or revivifying carbon a long shallow stationary trough open to the atmosphere at the top, and means for agitating and gradually propelling the charge in a relatively thin layer through the trough, and means for heating the charge to an activating temperature.

3. In apparatus for activating or revivifying carbon a long shallow trough, and means for agitating and gradually propelling the charge in a relatively thin layer through the trough, and means for heating the charge to an activating temperature, and cooling means for controlling the combustion of the charge at various stages during its passage through the trough.

4. In apparatus for activating and revivifying carbon, a long shallow stationary trough provided with a longitudinal series of rakes, means for causing the rakes to oscillate longitudinally to and fro to agitate and gradually propel the charge from rake to rake through the trough, and means for heating the charge.

5. In apparatus for activating and revivifying carbon, a long shallow trough provided with a plurality of oscillating rakes adapted to agitate and gradually propel the charge through the trough, and means for heating the charge, and cooling means for controlling the combustion of the charge at various stages during its passage through the trough.

6. In apparatus for activating or revivifying carbon, a long shallow trough provided with a plurality of oscillating rakes adapted to agitate and gradually propel the charge through the trough, and electrical heating means including oscillating rake electrodes for heating the charge to an activating temperature.

7. In apparatus for activating or revivifying carbon, a long shallow trough provided with a plurality of oscillating rakes adapted to agitate and gradually propel the charge through the trough, and means for heating the charge, and means for cooling the bottom of the trough to control the combustion of the charge.

8. In apparatus for activating or revivifying carbon, a long shallow trough provided with a plurality of oscillating rakes adapted to agitate and gradually propel the charge through the trough, and electrical heating means including oscillating rake electrodes for heating the charge to an activating temperature, and means for independently cooling various sections of the bottom of the trough to control the combustion of the charge.

STANLEY A. W. OKELL.
LEONARD WICKENDEN.